Sept. 17, 1957 R. N. YEAGER 2,806,349
SHEET METAL VARIABLE AREA NOZZLE
Filed Dec. 24, 1952 4 Sheets-Sheet 1
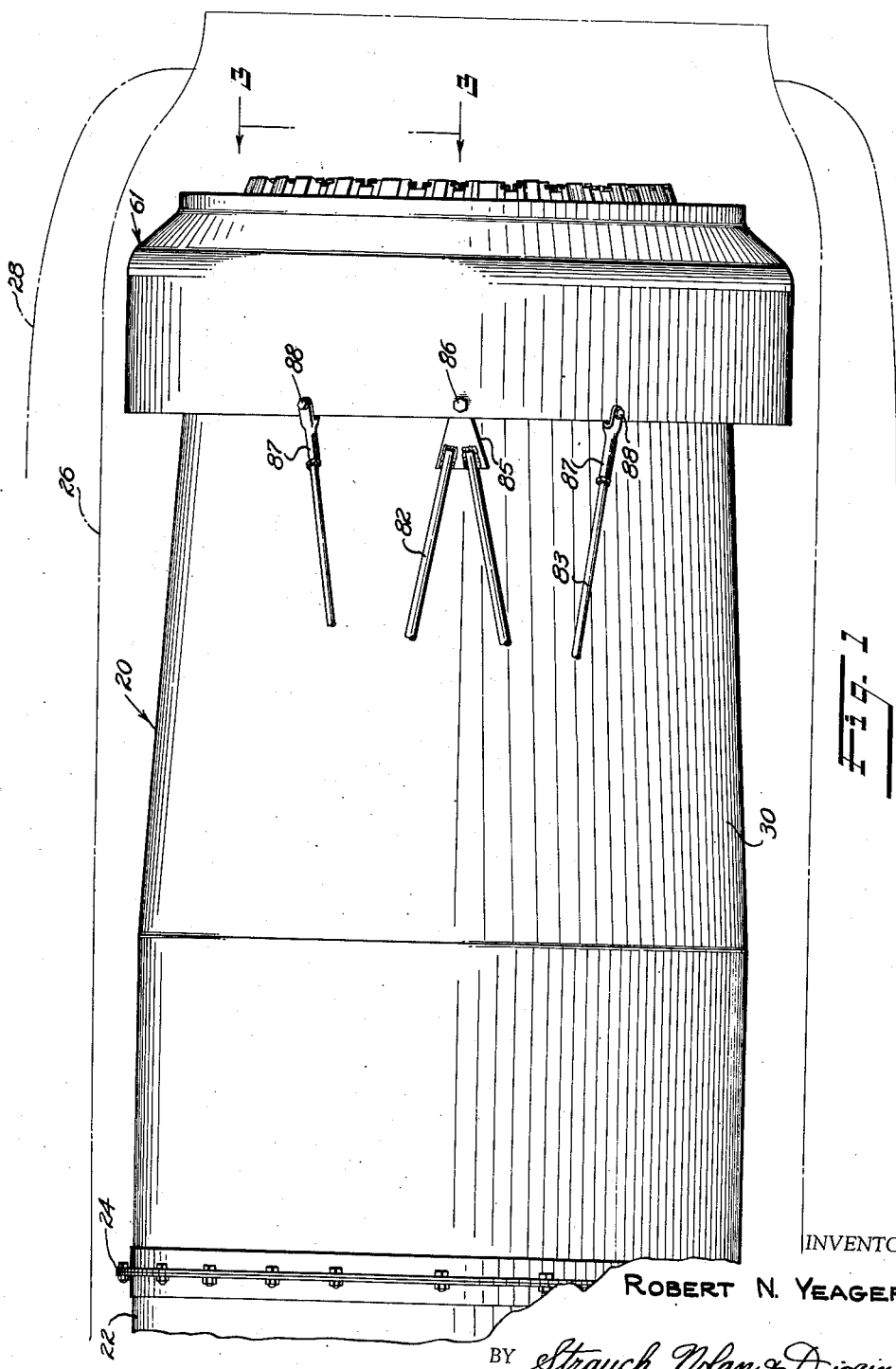
INVENTOR
ROBERT N. YEAGER
BY Strauch, Nolan & Diggins
ATTORNEYS

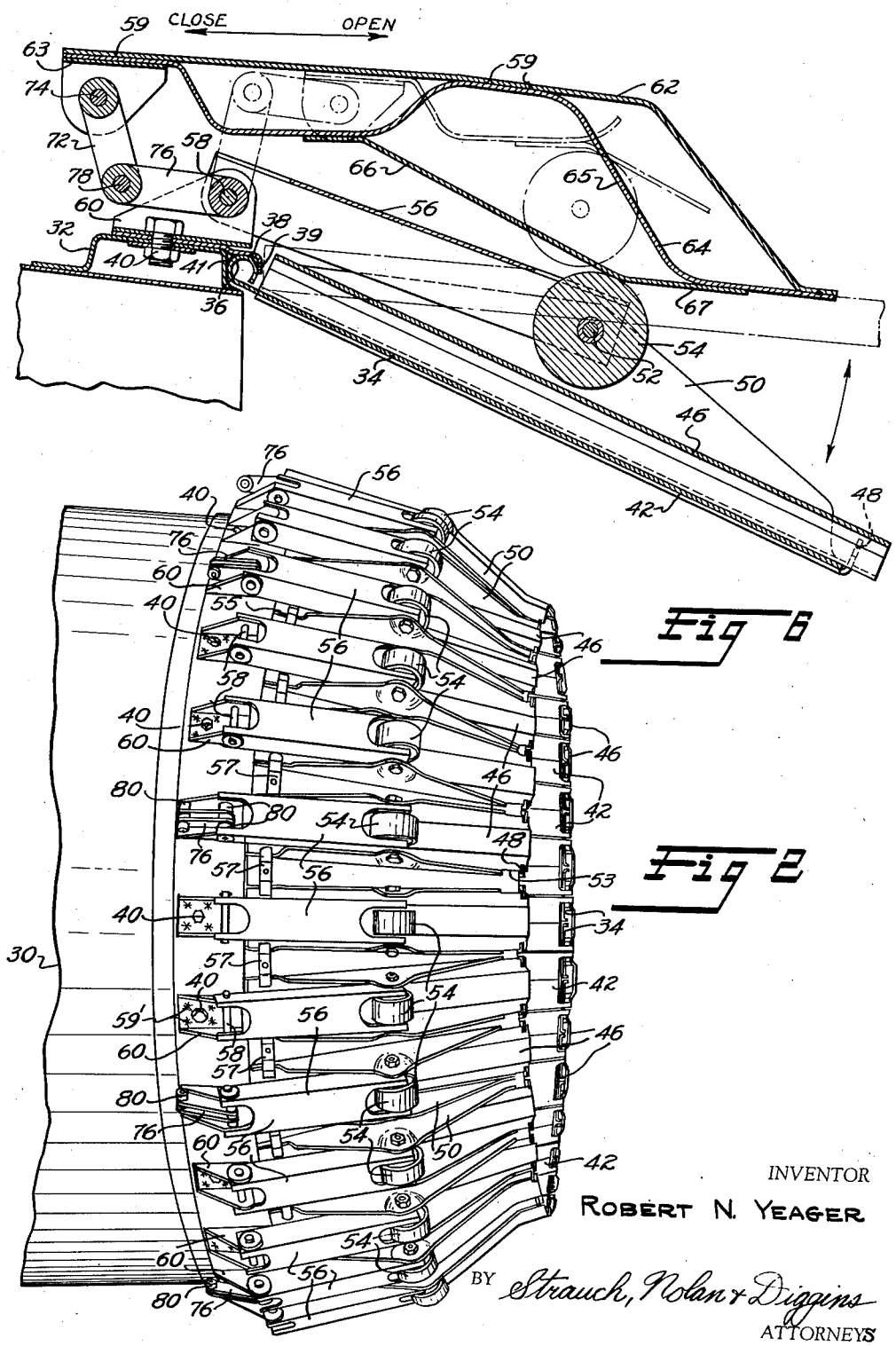

Sept. 17, 1957 R. N. YEAGER 2,806,349
SHEET METAL VARIABLE AREA NOZZLE
Filed Dec. 24, 1952 4 Sheets-Sheet 3
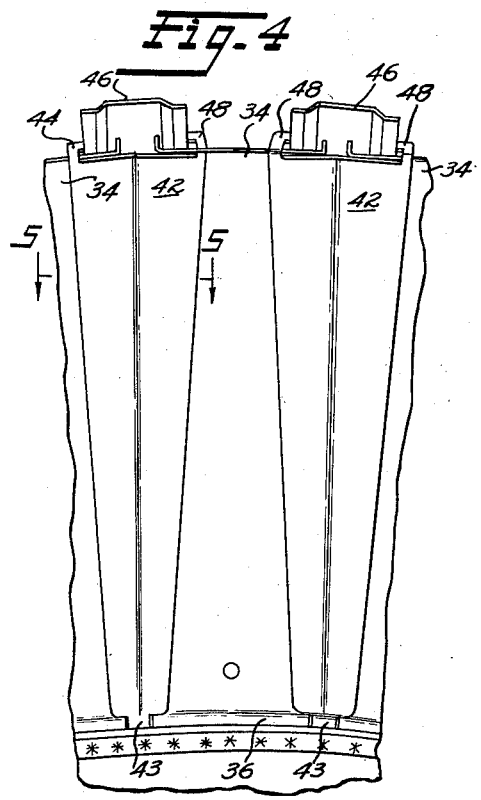
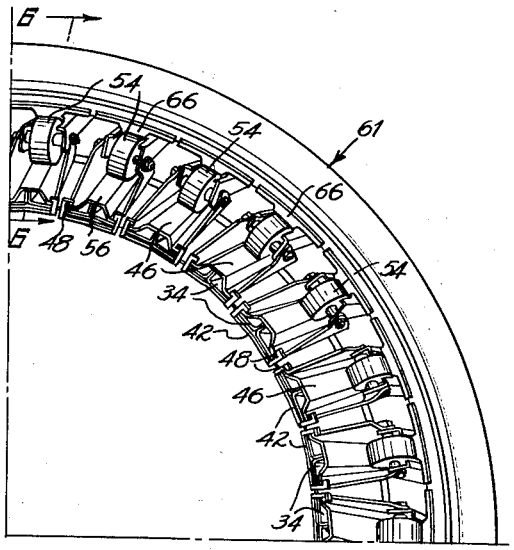
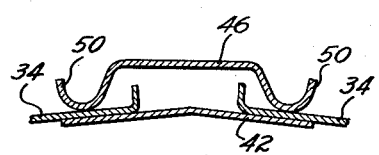
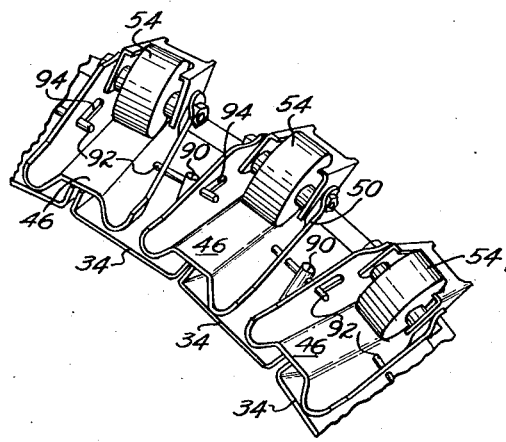
INVENTOR
ROBERT N. YEAGER
BY Strauch, Nolan & Diggins
ATTORNEYS Sept. 17, 1957 R. N. YEAGER 2,806,349
SHEET METAL VARIABLE AREA NOZZLE
Filed Dec. 24, 1952 4 Sheets-Sheet 4
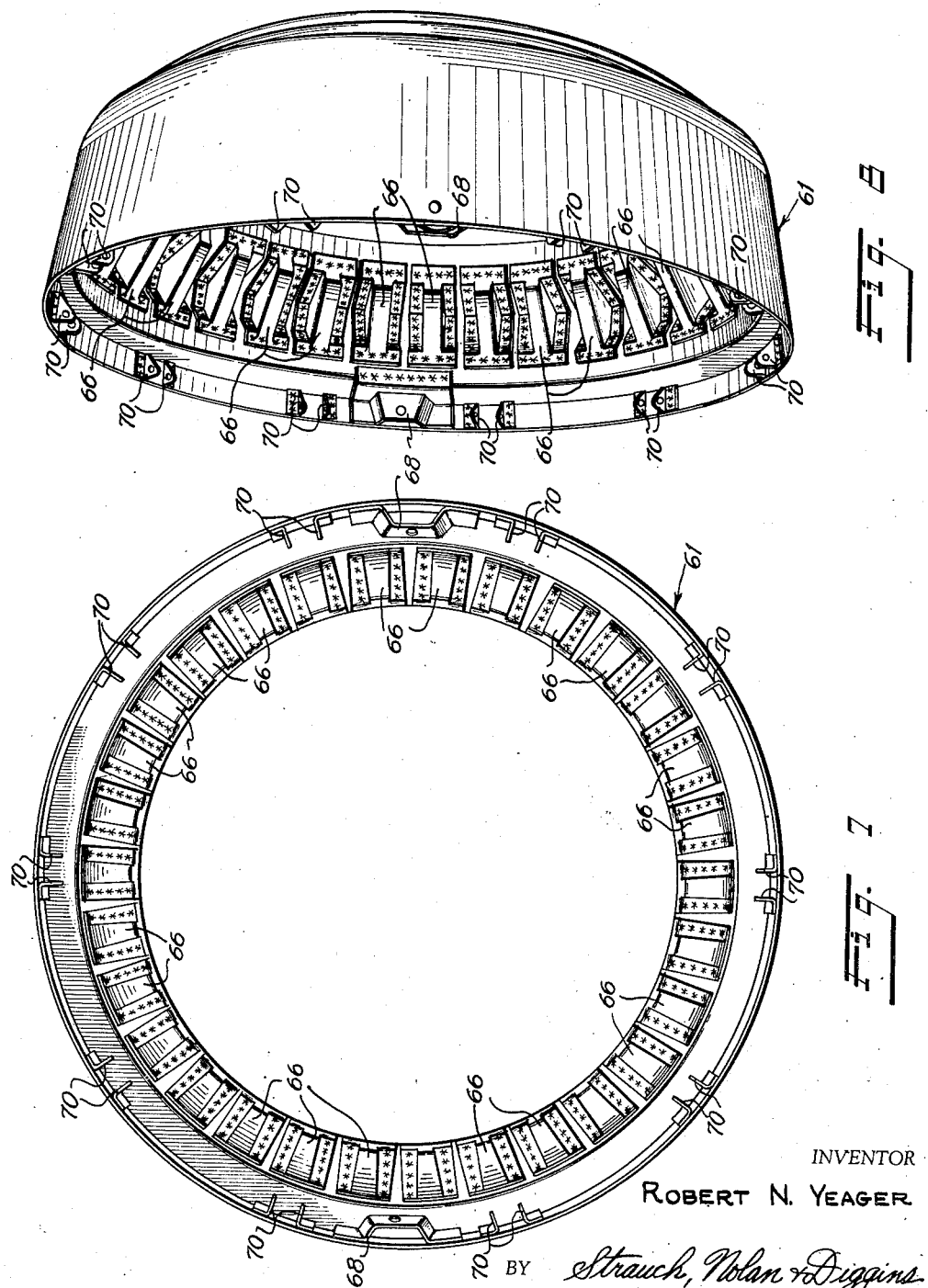
INVENTOR
ROBERT N. YEAGER
BY *Strauch, Nolan & Diggins*
ATTORNEYS 2,806,349
Patented Sept. 17, 1957

2,806,349
SHEET METAL VARIABLE AREA NOZZLE

Robert N. Yeager, San Diego, Calif., assignor to Solar Aircraft Company, San Diego, Calif., a corporation of California Application December 24, 1952, Serial No. 327,827

14 Claims. (Cl. 60—35.6)

The present invention relates to variable area nozzles and more specifically to variable area nozzles for engines in which a thrust is produced by the reaction of high velocity gases ejected through said nozzles.

The invention is particularly adapted for use in turbojet aircraft engines equipped with afterburners, where the area of the nozzle must be adjustable to compensate for a wide range of operating conditions during normal non-afterburning flight and for sudden changes in pressure caused when the afterburner is placed in operation or turned off.

It is well known in the art that weight is a critical factor in the design, selection and construction of aircraft propulsion systems. Prior to the present invention, the weight of the average variable area nozzle, such as for example, those disclosed in co-pending applications Serial No. 150,127, filed March 17, 1950, and Serial No. 238,428, filed July 25, 1951, and now abandoned, is approximately 200 pounds, constituting about 40% of the total weight of the afterburner assembly. A plain tailpipe, i. e., one without provision for afterburning, weighs approximately 100 pounds. Not only does the conventional afterburner assembly add weight to the installation but, since the afterburner is located at the extreme after end of the power plant, the weight is concentrated at undesirable points of the aircraft, i. e., at the extreme rear of the fuselage of single engine aircraft and at the trailing edge of the wings in multi-engine installations.

From the above, it will be appreciated that reduction in afterburner weight is an extremely important desideratum in the field of jet propelled aircraft.

Prior variable or flap-type nozzles heretofore have included a heavy cast and/or machined ring at the base of the nozzle flaps, or heavy cast and/or machined flaps, or both. In some cases heavy gauge sheet metal flaps were secured to the aforementioned cast and/or machined base ring; in other cases, the ring was of heavy gauge sheet metal construction while the flaps were of heavy cast, machined construction. The use of such components resulted in undesirably heavy assemblies.

In addition, the base rings used in prior assemblies require precision machining, the ring being cast or forged substantially larger in all dimensions and then machined by slow and tedious operations to the complex geometry of the finished unit. Such machining operations, in addition to being costly, involve the waste of large quantities of highly alloyed materials presently on critical or strategic lists and resulted in raising the cost of the ring alone to the currently quoted market price of $1,000.00.

Another drawback found in prior art constructions resides in the use of complex sealer assemblies employed to protect the individual flaps against leakage. Said assemblies are made of such materials as Inconel braid type packing, composed of approximately 18 percent chrome and 80 percent nickel, both alloying elements in short supply and great demand.

Still another undesirable feature of prior art devices resides in the complex assemblies installed between the flaps and their actuating ring or shroud to effect the opening and closing of the flaps as required by engine operation. The very complexity of these flap control mechanisms is such that ram air flowing between the actuating ring and the nozzle for cooling purposes is frequently obstructed.

The present invention which was developed to overcome the cost, weight and operating deficiencies of the prior assemblies comprises essentially a variable area nozzle composed of a tubular sheet metal member adapted to be attached at one end to the exhaust end of conventional afterburners and carrying at its other end a plurality of annularly arranged sheet metal flaps swingably attached thereto. The flaps are movable to an exhaust-jet restricting position by means of the longitudinal movement of a cylindrical control ring having internal camming surfaces which act upon rollers carried in operative relation to the flaps. The area of the exhaust orifice is enlarged by reverse movement of the control ring, thereby relieving the camming pressure on the rollers and allowing the exhaust gas pressure to move the flaps outwardly in an area-enlarging direction. Substantially all of the major components of the novel assembly are of low-cost, light weight sheet metal construction.

Accordingly, it is the primary purpose and object of the present invention to provide novel multiple-flap, variable-area nozzles, substantially of sheet metal construction throughout, which will effect a weight saving of approximately 33% as compared with the best known prior assemblies.

It is another major object of the invention to provide variable-flap type nozzles which are easily and inexpensively fabricated using flaps and base rings made of sheet metal.

It is still another object of the invention to provide novel sheet metal flap retaining ring assemblies for variable area nozzles which can be simply and quickly constructed of comparatively thin stamped rings; which cost less than 10% of corresponding components in prior structures; which can be stamped, trimmed, drilled and assembled into the nozzle assembly in approximately one-fourth of the time required to machine the prior art flap retainers; and which use only a small amount of metal as compared to conventional structures.

Another important object of the present invention is to provide a variable area nozzle having a novel labyrinth system of flap co-action which eliminates the necessity for prior art sealing devices and yet seals the joints occurring at the point of tangency of the flaps so that no potential thrust is lost by leakage of exhaust gas therethrough.

Another object of the invention is to provide an improved nozzle control mechanism which closes the nozzle when the afterburner is not in operation by means of a simple roller mechanism exerting external pressure on the flaps and utilizes the pressure of the exhaust gas to keep the flaps in open position during afterburning.

It is yet another object of my invention to provide a novel relationship between the actuating ring and the nozzle, which forms passages permitting the flow of ram cooling air with minimum obstruction.

Further objects of the invention include the facilitation of assembly and dissasembly of the unit.

Additional objects and advantages will become apparent to those conversant with the art as the following description and subjoined claims are read in connection with the annexed drawings in which:

Figure 1 is a side elevation of an afterburner unit showing the control rods, actuating ring and variable area nozzle of the present invention;

Figure 2 is a perspective side elevation of the variable area nozzle with the actuator ring removed;

Figure 3 is a quarter section of an end elevation of the variable area nozzle as viewed in the direction indicated by arrows 3—3, Figure 1;

Figure 4 is a view of the interior of the nozzle showing a portion of the structure of Figure 2 as viewed from within the annulus;

Figure 5 is a sectional view taken on line 5—5 of Figure 4;

Figure 6 is a sectional view taken on line 6—6 of Figure 3;

Figure 7 is an end elevation of the actuating ring as viewed from the left side of Figure 8;

Figure 8 is a perspective elevation of the actuating ring; and

Figure 9 is an enlarged fragmentary view similar to Figure 3 but showing a modified form of the invention.

Referring to Figure 1, numeral 20 designates generally the afterburner tailpipe and variable area nozzle of the present invention shown as attached to the rearward end of a conventional afterburner 22 by means of the usual bolted butt flanges 24. The nozzle is enveloped by the liner or tunnel 26 which protects the nacelle 28 of the aircraft from the high afterburner temperatures.

The tailpipe and nozzle assembly consists of a tubular, frusto-conical barrel 30 carrying on its aft end a base ring in the form of an annular hat section member 32 (see Figure 6) and a plurality of annularly disposed flaps 34 having rolled or formed forward ends 36. The flaps are swingably retained against the hat section ring 32 by means of a retainer ring 38 having a lip or flange 39, the retainer ring being detachably secured to the hat section ring as by nut and bolt fasteners 40 to form an annular channel 41 for receiving rolled ends 36 of the flaps.

Attached to the barrel in the same manner and between each of the flaps 34 are an equal number of sealing plates 42, most clearly shown in Figures 4 and 5, having rolled ends 43 disposed in channel 41 between rolled ends 36 of flaps 34. The term "rolled" as used herein to describe the ends of the flaps and sealing plates is intended to be descriptive of a structural characteristic rather than a method of construction. As a matter of fact, the rolled ends may be and usually are formed in a press brake rather than by rolling. Furthermore, it will be understood that the ends of the flaps and plates may be formed with various other types of retaining enlargements.

Referring to Figures 4 and 5, the sealing plates overlie the under sides of the flaps 34, bridging and effectively sealing the seam between the adjacent edges of adjacent flaps. The rearward ends of outer flaps or pressure plates 46 overlie the flaps 34 in bridging relation to the interstices between adjacent flaps. The rearward ends of the sealing plates terminate in pairs of fingers 48 which hook over the ends of pressure plates 46, as best shown in Figures 3 and 4.

The outer flaps or pressure plates 46, of which there are a number equal to the number of flaps 34 and sealing plates, are sheet metal elements of channel-shaped cross-section and have upturned triangular-shaped extensions 50 on each side flange, which extensions serve as trunnions for axles 52 carrying rollers 54. The rearward ends of the pressure plates are notched as at 53 (see Figure 2) to accommodate fingers 48. The forward ends of the upturned flanges 50 are similarly notched as at 55 to receive the oppositely extending legs of clips 57 which are attached, for example, by spot welding to flaps 34, and serve to prevent vertical and lateral dislocation of the pressure plates.

As shown in Figure 6, each pressure plate is attached to the barrel by means of a connecting link 56 which is journalled at one end on axle 52 and, at its other end, is pivotally mounted on pin 58 which is carried by ears 60 secured by any suitable means such as spot welding 59' to retainer ring 38, which in turn, is secured to hat section ring 32 by fasteners 40. Thus the rollers 54 are constrained to an arcuate path of travel having pins 58 as the center. As best shown in Figures 3 and 5, the sealing plates 42, flaps 34 and pressure plates 46 coact to form an articulated annulus, variable in circumference by the radial swinging movement of the various individual components. Since the pressure plates pivot about a different center (pins 58) than the inner flaps and seal plates (channel 41) cut out portions 53 and 55 are sufficiently elongated to accommodate the relative sliding movement between pressure plates, flaps and seal plates which occurs when these various components are moved from one position to another. As best shown in Figure 4, pressure plates 46 are longer than and project beyond seal plates 42 by an amount sufficient to prevent the disengagement of fingers 48 regardless of the relative positions of elements 42 and 46.

The flexible, segmented annulus just described is readily adjustable yet remains circular and is effectively sealed in all positions of adjustment.

The actuating ring, designated generally as 61, for controlling the position of the flaps is constructed of an outer shell 62 and an inner shell 64, as best appears in Figure 6, secured together by such means as spotwelds 59. Fastened around the inner periphery of the inner shell 64 also by means such as spotwelding are a plurality of camming surfaces 66, one for each of rollers 54. As best shown in Figures 7 and 8, a pair of diametrically opposed reinforcing brackets 68 are fastened to the forward end of the shell assembly for the attachment of control rods. Also attached around the inner periphery of the forward end of the actuating ring assembly are a plurality of paired attachment ears 70, selectively spaced so as to coincide with each third camming surface (although more or less frequent spacing may be used), for reasons which will hereinafter appear.

Referring to Figures 2 and 6 the actuating ring is mounted in telescoping relation with and for longitudinal movement relative to the barrel 30 by means of a linkage provided between each attachment ear 70 on the control ring and every third ear 60 on the retainer ring 38. Each linkage is composed of paired links 72 attached at one end to ears 70 by means of a pivot pin 74 and at the other end to a second pair of links 76 by means of a pivot pin 78 which second links are in turn pivotally secured to attachment ear 60 by pin 58. Suitable spacing means 80 are provided throughout the linkage at all pivot connections, which spacing means may be separate elements or integral with the links.

Thus the actuating ring is mounted on the barrel 30 for fore and aft displacement as indicated by the arrows in Figure 6, with camming surfaces 66 disposed in operative relation to rollers 54. Displacement of the actuating ring is accomplished by means of control rods 82 (Figure 1) on each side of the barrel extending from the conventional automatic controls (not shown) and being secured as by welding to a web plate 85 which, in turn, is pivotally fastened to the outer shell of the control ring by a bolt or rivet fastener 86 passing through the outer shell and brackets 68. Auxiliary tie rods 83 are also provided and are secured to actuating ring 61 by means of adjustable clevises 87 and pins 88. By proper adjustment, the control ring can be correctly aligned to remove any cant or tilt about its transverse horizontal axis and the circumferentially spaced attachment points of the rods 82 and 83 will preclude cocking of the control ring after it is once adjusted.

As shown in Figure 6, the inner circumference 63 of the inner shell 64 at the leading or forward end of the control ring has a substantially larger diameter than the end of the barrel 30 on which it is mounted, thus providing an annular space between the control ring and the tailpipe for the entrance of cooling air. The flow of air entering the control ring is deflected radially inwardly toward the flap assembly by means of the sloping surfaces 65, cam surfaces 66, and the smaller inner diameter portion 67 of the ring, thereby providing efficient cooling for and maintaining the temperature of the flap assembly within optimum limits. It will also be noted that the flap actuating mechanism is such as to cause very little obstruction to the cooling air flow. By providing such a system of air cooling, the danger of the flap assembly seizing or jamming because of excessive temperatures is minimized.

Operation of the device is based on uni-directional control of the exit orifice area. When the engine is operating at low power the actuating ring is in the forward limit position as shown by the solid lines, Figure 6. With the ring in this position, cam surfaces 66 acting on rollers 54, hold the flaps in fully depressed position also shown in solid line, Figure 6, thereby constricting the nozzle area to its minimum value. This fully closed condition of the nozzle is maintained until temperature and pressure conditions in the tailpipe require a greater exit area. Then, under the influence of automatic controls which schedule its position as a function of engine conditions, the actuating ring is moved rearwardly, to the right as shown in Figure 6, thereby relieving the restraining pressure exerted by cam surfaces 66 on the rollers and allowing the pressure of the jet stream to swing the flaps outwardly to the extent permitted by the new position of the cam surfaces.

When afterburning is on, the actuating ring is moved to its full aft (extreme right) position as shown in broken line in Figure 6. In this position, the jet stream pressure acting on the flaps forces them outwardly so that the rollers assume a position on the uppermost portion of the cam ramp, thereby providing the maximum exit orifice area. When afterburning is turned off the actuating ring is automatically positioned forwardly, forcing the rollers inwardly to reposition the flaps to obtain the desired exit area for the then existing operating conditions of the primary engine.

An alternative form of my invention which also achieves satisfactory results is shown in Figure 9 in which like reference numerals are used to designate like parts. In this form of construction, the seal plates 42 are eliminated as are retaining clips 57. The latter are replaced by T-shaped assemblies each comprising a stud 90 carrying a transverse pin 92. Each stud is fastened to and projects from the upper surface of a flap 34 with the ends of the transverse pin fitting into slots 94 provided in the upturned flanges 50 of adjacent pressure plates 46. The slots are in the plane of relative motion between the pressure plates and the flaps so that the two elements are maintained in alignment throughout the cycle of opening and closing. The remaining structure and the operation of the modification is in all respects identical with that of the first described embodiment. It has been found that the elimination of the seal plates 42 reduces the weight of the nozzle assembly somewhat but results in a small increase in gas leakage through the flap assembly. This increase is only slight, however, and is entirely acceptable in many applications.

From the foregoing description of exemplary embodiments of the present invention it will be seen that ample clearance is provided between the control ring, tail-pipe and flaps to permit the flow of cooling air substantially unobstructed by the control linkage. Furthermore the structure of the novel variable area nozzle is simple, rugged, dependable and efficient yet light in weight, easily assembled and dismantled, and susceptible of rapid and inexpensive manufacture.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A variable area nozzle for jet propulsion engines comprising a barrel adapted to be attached, at one end, to the exhaust conduit of such an engine, a sheet metal annulus secured to the free end of said barrel around the outer periphery thereof, a retainer ring removably secured around said annulus, a plurality of annularly arranged, juxtaposed sheet metal flaps having rolled ends swingably retained by said annulus and ring, a plurality of pressure plates pivotally connected to said barrel and disposed in bridging relation to the outer surfaces of said flaps, a roller journalled on each of said pressure plates, an annular, fabricated sheet metal actuating assembly having a portion substantially surrounding said flaps and said pressure plates, and mounted on said barrel for axial displacement relative to said barrel, cam means on the interior surface of said portion of said actuating assembly coacting with said rollers to move said flaps radially inwardly upon axial displacement of said actuating assembly and means for axially moving said actuating assembly.

2. A variable area exhaust nozzle for use with jet engines having afterburners comprising, a tubular barrel, a plurality of juxtaposed sheet metal flaps annularly disposed at one end of said barrel around the outer periphery thereof, means securing said flaps to said barrel end for radial swinging movement, roller carrying means pivotally secured to said barrel end and overlying said flaps each in bridging relation to adjacent flaps, an annular fabricated sheet metal actuating assembly, having a portion surrounding said flaps and roller carrying means and mounted on said barrel for axial movement relative thereto, and cam surfaces on the interior of said portion of said actuating assembly cooperating with said roller-carrying means to effect radially inward displacement of said flaps in response to axial movement of said actuating assembly.

3. In a device of the character described, a tubular barrel, an annular hat-section element secured to the outer periphery of said barrel adjacent one end thereof, a plurality of annularly juxtaposed flap elements secured to said barrel end for radial swinging movement, a plurality of pressure plates swingably secured to said barrel end in bridging relation to said flaps, cam follower means mounted on said pressure plates, an annular actuating member enveloping said flaps and pressure plates and having cam means on its interior surface in operative relation with said cam follower means, and means for mounting said actuating member on said barrel for axial movement, said mounting means comprising a plurality of annularly spaced attachment ears secured to said hat-section element, links pivotally connected to each of said ears, additional links pivotally connected at one end to each of said first mentioned links and at the other end to said actuating member.

4. In a variable area nozzle, a barrel, an annular hat-section element secured about the outer periphery of said barrel adjacent one end thereof, a retainer ring cooperating with said hat-section to form an annular channel, a plurality of annularly juxtaposed flaps each having a rolled end pivotally retained in said channel, a plurality of elongated annularly juxtaposed pressure plates each overlying a pair of adjacent flaps in bridging relation, a transverse axle mounted on each of said pressure plates substantially midway between the ends thereof, rollers mounted on said axles, and means for exerting pressure on said rollers to force said pressure plates and flaps radially inwardly toward the axial center line of said barrel.

5. A fabricated annular control assembly for controlling the flaps of a variable area nozzle for jet engines comprising an outer annular sheet metal shell, an inner sheet metal shell welded to said outer shell, and a plurality of annularly spaced camming surfaces welded to said inner shell.

6. In a variable area nozzle for jet engines having a plurality of annularly juxtaposed, radially movable flaps, means for sealing said flaps comprising a plurality of elongated channel-shaped elements contacting the radially outer surfaces of said flaps and each disposed in bridging relation to a pair of adjacent flaps, said elements having upturned lateral edges, circumferentially aligned slots in said lateral edges and T-shaped assemblies mounted on said outer surfaces of said flaps each having a cross pin extending into the slots of adjacent edges of adjacent channel-shaped elements.

7. In a variable area nozzle for jet engines having a plurality of annularly juxtaposed, radially swingable flaps, means for sealing the space between such flaps comprising a plurality of elongated channel-shaped elements contacting the radially outer surfaces of said flaps and each disposed in bridging relation to a pair of adjacent flaps, a plurality of sealing plates disposed against the radially inner surfaces of said flaps, each directly opposite one of said channel-shaped elements, attachment means on said sealing plates engaging one end of said elements, and clip members on said flaps engaging the other end of said elements.

8. In variable area nozzle for jet engines, a tail pipe, a plurality of elongated flaps arranged around the open end of said tail pipe and having one end secured to said tail pipe end for radial swinging movement, a like plurality of channel-shaped elements disposed around and contacting the radially outer surfaces of said flaps, each of said elements bridging a pair of adjacent flaps, a like plurality of sealing plates, each disposed directly opposite a corresponding channel-shaped element against the radially inner surfaces of said flaps, said sealing plates each having one end secured to said barrel end for radial swinging movement, finger means on the other end of each sealing plate adapted to engage one end of a corresponding channel-shaped element, and clip means on each of said flaps each adapted to engage a pair of adjacent channel-shaped elements.

9. In a combination as defined in claim 8, a like plurality of connecting links, each having one end pivotally secured to said barrel end, the other end of said links being pivotally secured to said channel-shaped elements substantially midway between the ends of said plates.

10. A sheet metal variable nozzle for jet engines comprising a tubular barrel having one end open for the emission of a propulsive jet stream, a sheet metal ring of hat-shaped cross-section secured around the open end of said barrel, a retaining ring detachably secured around said hat-section ring, a circumferential lip on said retaining ring co-operating with said hat-section ring to form an annular channel around said open barrel end, a plurality of elongated flap elements each having one end rolled to form a bead portion, said flap elements being disposed in juxtaposition around said barrel end with said bead portions pivotally retained in said channel to form a segmented annulus, a like plurality of sealing plates each having one rolled end pivotally retained in said channel between the rolled ends of each pair of flaps to form a second segmented annulus within said first mentioned annulus, said sealing plate being circumferentially displaced relative to said flaps so that each plate bridges the interstice between adjacent flaps, a like plurality of pressure plates disposed around the outer periphery of said flap annulus with each pressure plate disposed opposite a corresponding sealing plate and bridging the interstice between adjacent flaps, a pair of finger means on the free end of each sealing plate engaging the corresponding end of each pressure plate to maintain opposite sealing plates and pressure plates in clamping relation to the adjacent lateral edges of adjacent flaps, and transversely extending clip means on each of said flaps in close proximity to the pivotally retained end, each engaging the corresponding ends of adjacent pressure plates to maintain said corresponding flap and pressure plate ends in clamping relation.

11. A sheet metal variable nozzle as defined in claim 10, having an axle mounted transversely on each of said pressure plates, and a connecting link for each pressure plate having one end journalled on said axle and the other end pivotally secured to said barrel.

12. A variable area nozzle as defined in claim 11, having an annular control ring mounted on said barrel for axial displacement relative thereto, and surrounding said annuli, said control ring having cam surfaces on its inner periphery adapted to exert a radially inwardly directed force on said rollers when said control ring is moved in one direction and to release said force when moved in the opposite direction.

13. A continuously variable substantially circular nozzle for controlling the flow of exhaust gases issuing from a jet engine tail pipe comprising; a plurality of interlocking inner and outer nozzle defining members; means pivotally mounting certain of said members on said tail pipe; a plurality of sealing elements pivotally secured to said tail pipe, said elements extending along the inner surface of and between adjacent inner nozzle defining members and means securing said sealing elements to said outer nozzle members adjacent the downstream end thereof.

14. A continuously variable substantially circular nozzle for controlling the flow of exhaust gases issuing from a jet engine tail pipe comprising, means forming an annular channel around the open end of said tail pipe, a plurality of interlocking inner and outer nozzle defining members, said inner nozzle members having end mounting means pivotally retained in said channel, means pivotally mounting said outer nozzle members on said tail pipe, a plurality of sealing elements having end mounting means pivotally retained in said channel, said elements extending along the inner surface of and overlying the interstices between adjacent inner nozzle members, means securing the free ends on said sealing elements to one end of said outer nozzle members, and means securing the other ends of said outer nozzle members to the retained ends of said inner nozzle members.

References Cited in the file of this patent

UNITED STATES PATENTS

| 1,876,242 | Kellogg | Sept. 6, 1932 |
| 2,597,253 | Melchior | May 20, 1952 |
| 2,634,578 | Kallal | Apr. 14, 1953 |
| 2,637,163 | Brown et al. | May 5, 1953 |
| 2,693,078 | Laucher | Nov. 2, 1954 |
| 2,697,907 | Gaubatz | Dec. 28, 1954 |
| 2,699,645 | Oulianoff et al. | Jan. 15, 1955 |